United States Patent
Grimme et al.

(10) Patent No.: US 8,214,757 B2
(45) Date of Patent: Jul. 3, 2012

(54) CONTROL DEVICE FOR A MEDICAL IMAGING TECHNOLOGY SYSTEM WITH AN INTEGRATED WEB BROWSER THAT AUTOMATICALLY SUPPLEMENTS QUERIES

(75) Inventors: Andreas Grimme, Erlangen (DE); Christof Krellmann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 266 days.

(21) Appl. No.: 12/410,617

(22) Filed: Mar. 25, 2009

(65) Prior Publication Data
US 2009/0271717 A1    Oct. 29, 2009

(30) Foreign Application Priority Data
Mar. 25, 2008    (DE) .......................... 10 2008 015 555

(51) Int. Cl.
*G06F 3/048*    (2006.01)
(52) U.S. Cl. .................... 715/771; 715/708; 715/760
(58) Field of Classification Search .................. 715/760, 715/708, 771
See application file for complete search history.

(56) References Cited

U.S. PATENT DOCUMENTS

| | | | |
|---|---|---|---|
| 6,353,445 B1 * | 3/2002 | Babula et al. ................. | 715/733 |
| 6,667,747 B1 | 12/2003 | Spellman et al. | |
| 7,020,844 B2 * | 3/2006 | Trevino et al. ................ | 715/772 |

FOREIGN PATENT DOCUMENTS
DE    102 13 848 A1    10/2003
* cited by examiner

*Primary Examiner* — Andrey Belousov
(74) *Attorney, Agent, or Firm* — Schiff Hardin LLP

(57) ABSTRACT

To execute a program, a computer opens a usage window of a user interface of the program when calling the program. Via the opened usage window, the computer receives usage commands for a usage part of the program from a user, the usage commands being presented during the input thereof in the usage window, or in a usage command window of the user interface. The computer executes a usage action corresponding with a usage command after validation of the usage command, and receives retrieval commands from the user to retrieve additional information. The retrieval commands are presented in a retrieval command window of the user interface during the input of said retrieval commands. Additional information is received from a web server after the validation of the respective retrieval command. The retrieval and output of the additional information is an action different from the usage action. The information window, the retrieval command window, the usage window and the usage command window are different windows.

8 Claims, 4 Drawing Sheets

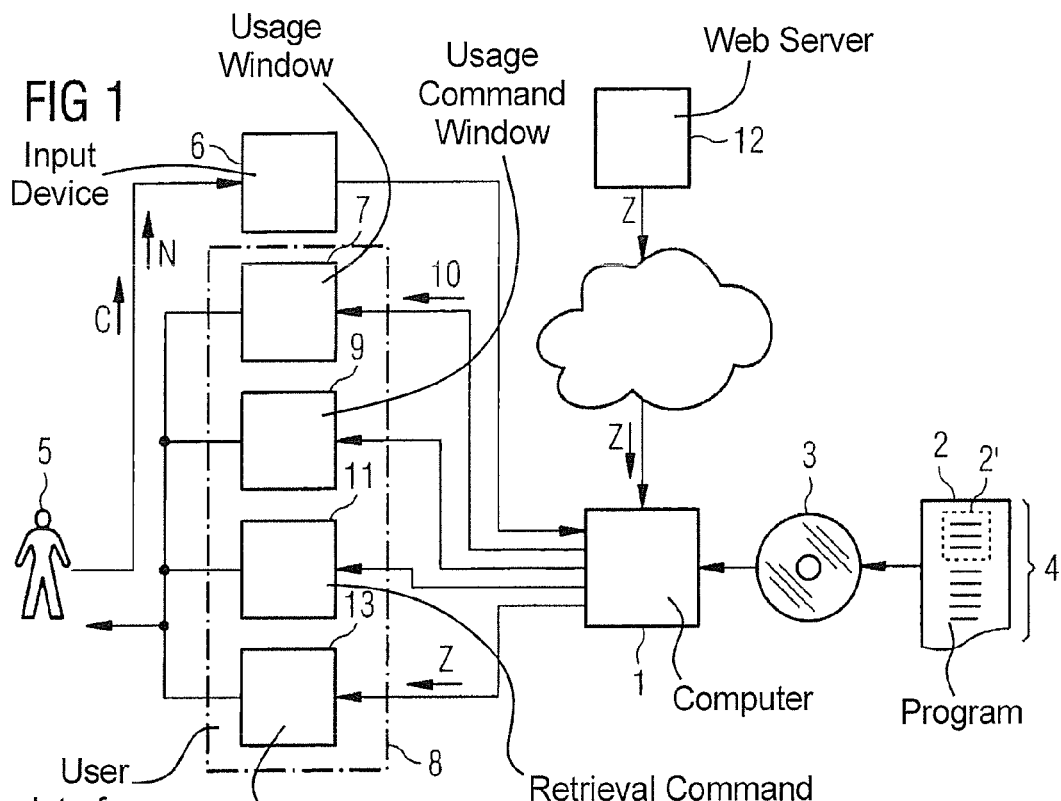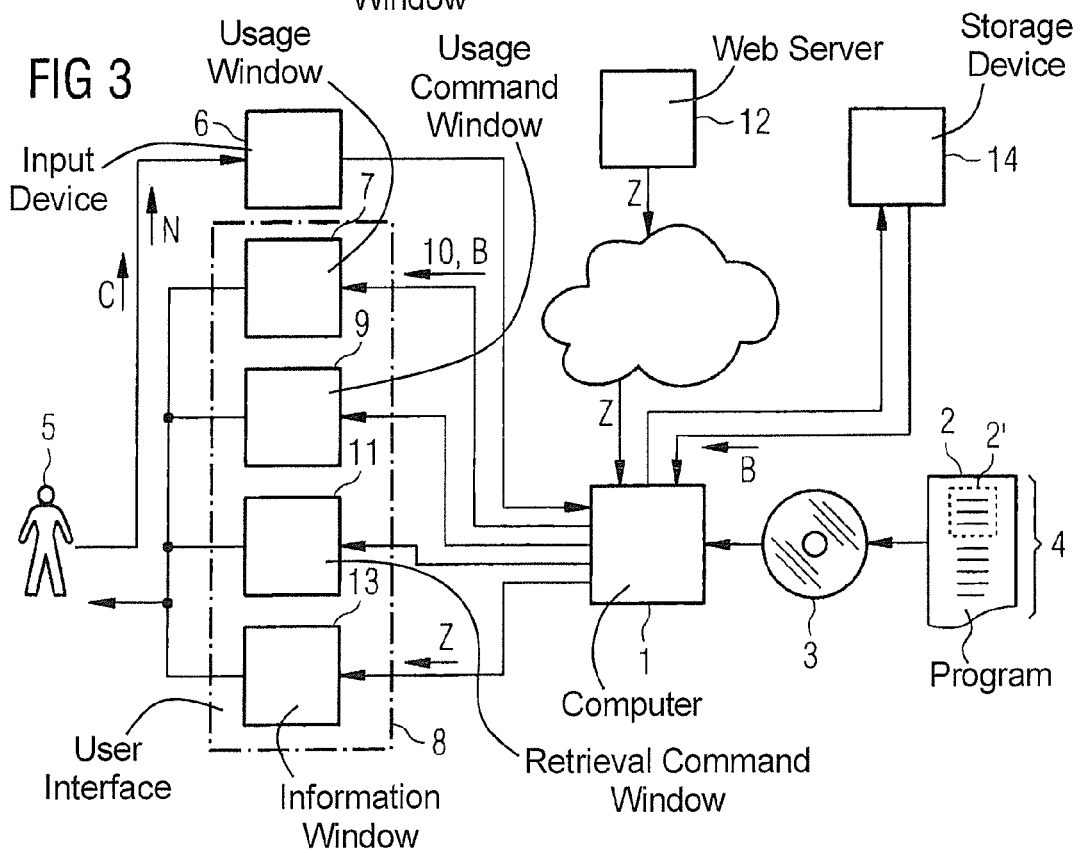

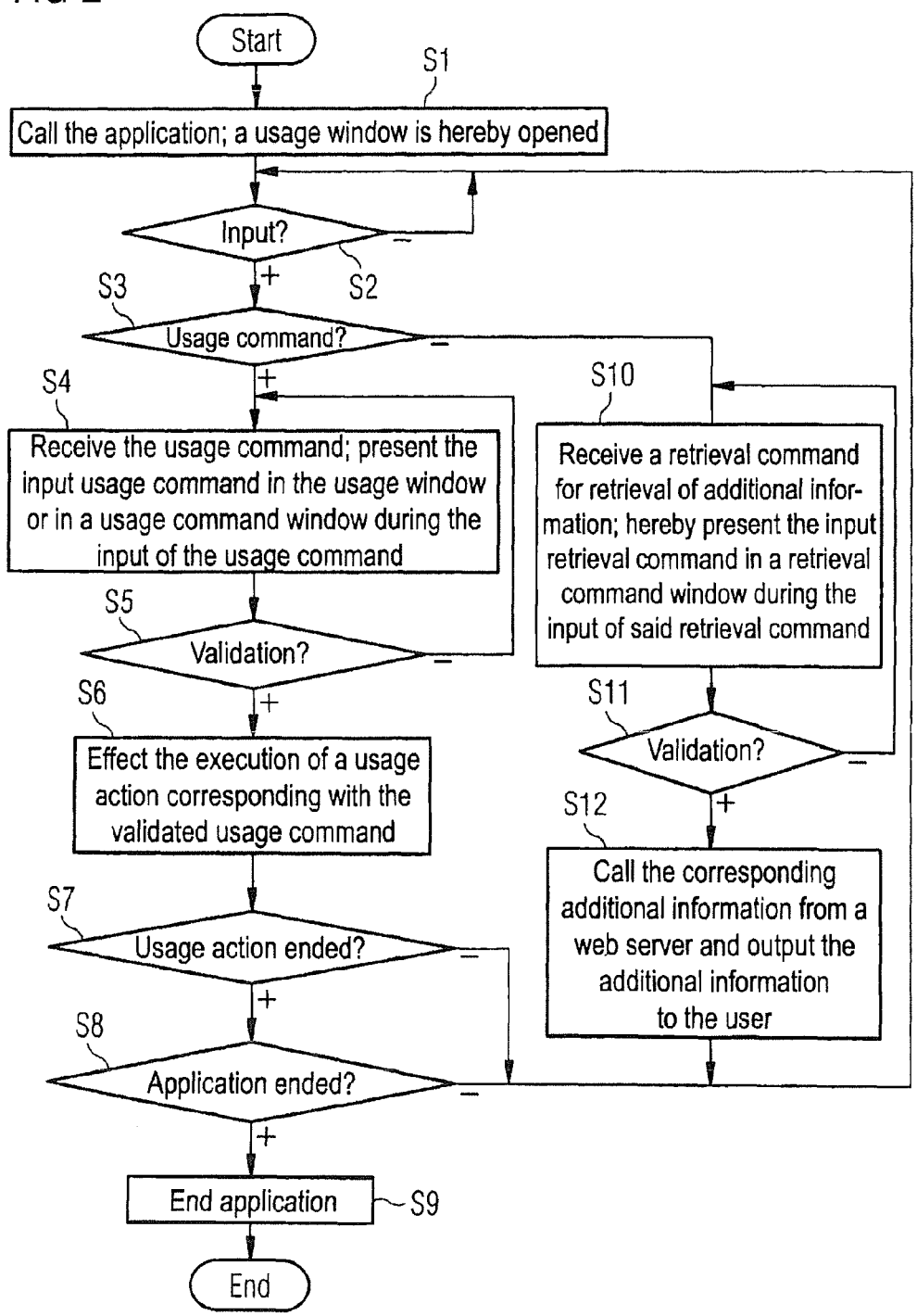

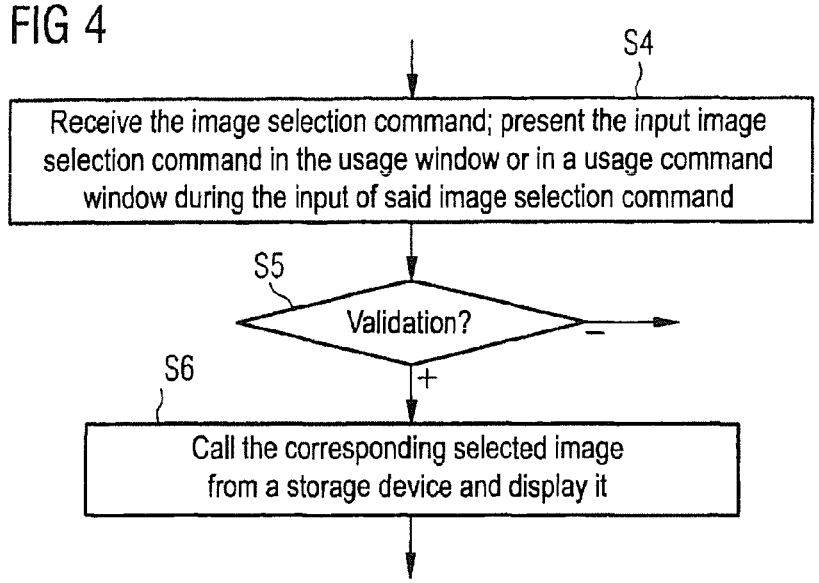
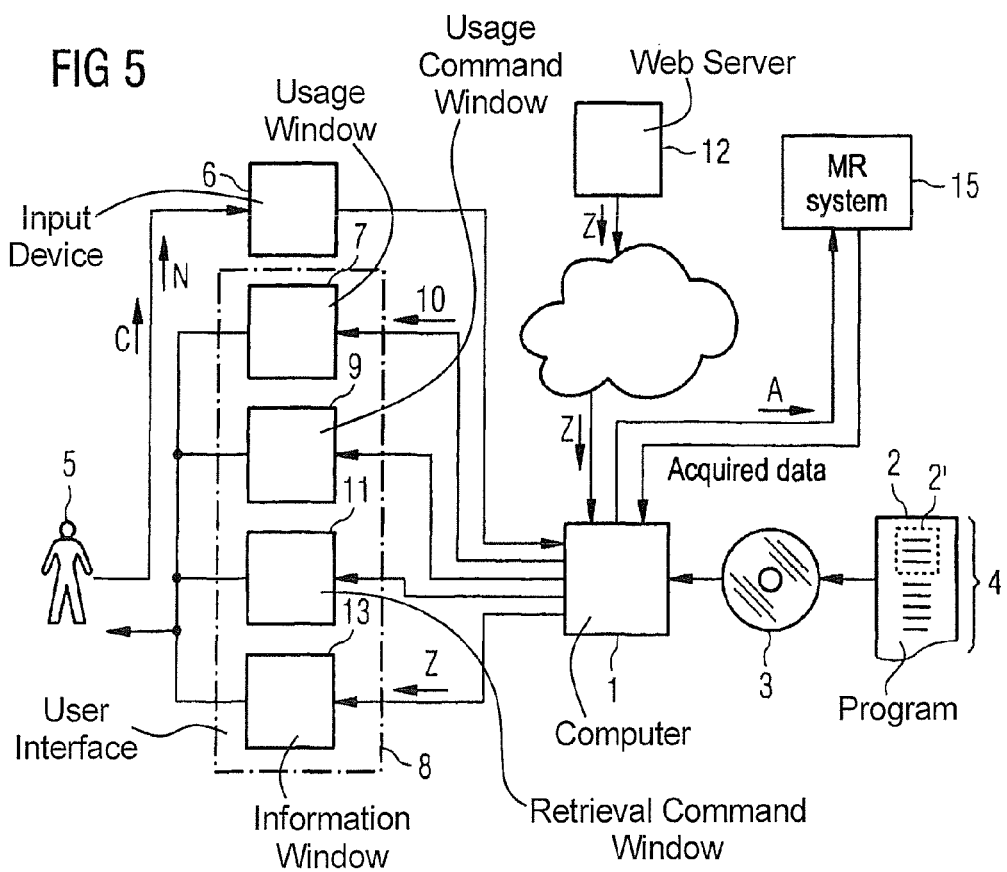

CONTROL DEVICE FOR A MEDICAL IMAGING TECHNOLOGY SYSTEM WITH AN INTEGRATED WEB BROWSER THAT AUTOMATICALLY SUPPLEMENTS QUERIES

BACKGROUND OF THE INVENTION

1. Field of the Invention

The present invention concerns an operating method for a computer, of the type wherein the computer executes an application and opens a usage window of a user interface of the application in the framework of calling the application. In the framework of the execution of the application with an opened usage window, the computer receives usage commands for a usage part of the application from a user of the computer via an input device, presents the usage commands during the input of the usage commands in the usage window or in a usage command window of the user interface that is associated with the usage window, the usage command window being different from this usage window, and effects the execution of a usage action corresponding with the respective usage command after the validation of the respective usage command.

The present invention furthermore concerns a computer-readable medium encoded with programming instructions that can be directly executed by a computer, wherein the execution of the programming instructions by the computer causes the computer to execute such an operating method.

Furthermore, the present invention concerns a computer that is programmed with such instructions. The present invention also concerns a technical device that is controlled by a control device, fashioned as such a computer.

2. Description of the Prior Art

Operating methods of the type described above are generally known and are used, for example, at monitor (display) workstations for evaluation of patient images. Such operating methods are also used in control programs for technical devices, for example for medical imaging systems. An example of such a medical imaging system is a magnetic resonance tomography apparatus. Computer tomography systems, ultrasound systems and C-arm x-ray systems are other examples.

In the implementation of procedures at such workstations, the user should be enabled to receive procedure-specific additional information, for example in the context of a clinical workflow. The additional information can be, for example, specifically with regard to the treated patient, the procedure to be implemented or the medical imaging device itself. However, the manufacturer of the computer on which the application runs cannot know in advance which additional information the user will desire. The manufacturer of the application therefore does not have the possibility to specifically design the user interface so that the additional information can be displayed.

Even if the appropriate information were known to the creator of the program, embedding the additional information in the program would be extremely complicated. Not only would the embedding have to be implemented multiple times, but also it would have to be ensured that it does not lead to impermissible interactions with the actual usage part of the program. In all cases a new approval process with an approval authority must also occur.

Therefore, it is typical in the prior art to provide the additional information in the form of printed material, for example in the form of a loose leaf binder or in the form of small notices. Furthermore, it is known to provide a second monitor workstation that enables access to the desired additional information. However, this second monitor workstation is completely isolated with regard to the monitor workstation with which the program therewith is executed.

It would be desirable if the desired additional information were directly integrated into the user interface of the monitor workstation. However, this would not be regarded as reasonable in the prior art due to the required modifications of the application and the high costs associated therewith.

SUMMARY OF THE INVENTION

An object of the present invention is to allow display of arbitrary additional information in a simple manner in a program of the type described above, wherein the additional information also can be subsequently altered.

The above object is achieved according to the invention by a computer that receives retrieval commands from the user via the input device to retrieve additional information, presents the retrieval commands in a retrieval command window of the user interface during the input of said retrieval commands, and retrieves the corresponding additional information from a web server after the validation of the respective retrieval command and outputs the corresponding additional information to the user via the retrieval command window, or an information window different from the retrieval command window, but associated with the retrieval command window.

The retrieval and output of the additional information is an action different from the usage action. The information window and the retrieval command window are windows different from the usage window and from the usage command window.

By means of the procedure according to the invention, the possibility is provided to retrieve information from outside the application and to present it within the application. Therefore, the retrieval of arbitrary information is possible. The possibility to retrieve the information must only be implemented (once) on the part of the application. The corresponding approval proceedings with the corresponding authority also must be conducted for the application according to the invention. However, the application is independent of the additional information to be presented. It is therefore sufficient to conduct the procedure a single time.

The procedure according to the invention can also be achieved when the computer is fashioned as a control device for a technical device, the usage part forms a controller of the technical device and the usage actions are operating modes of the technical device. Nevertheless, an intervention in the usage part (thus in the actual control software) as such is unnecessary.

The technical device can in principle be an arbitrary technical device. For example, the technical device can be a medical imaging system.

In many cases, the execution of the usage actions includes the display of basic information in the usage window. For example, an operation can be output, or the present status of a controlled device can be displayed. It is also possible to display images that are acquired in situ by means of the medical imaging system.

It is likewise possible for the usage actions to be the output of images via the usage window, that the usage commands are the image selection commands to select the images to be displayed, and that the images are not components of the program.

In a preferred embodiment of the operating method according to the invention, the information window is fashioned as a browser window, and the computer receives the retrieval commands in the form of URLs. The information window can in particular be fashioned as a web browser.

In a preferred embodiment of the operating method according to the invention, the computer furthermore automatically determines at least one expansion parameter using the currently applicable usage command and automatically parameterizes the retrieval commands with the at least one expansion parameter. A particularly comfortable specification of the retrieval commands is possible with this measure.

The object is furthermore achieved by a computer-readable medium encoded with programming instructions that can be directly executed by a computer, wherein the execution of the machine code by the computer causes the computer to implement an operating method according to the invention.

The object also is achieved by a computer that is programmed in such a manner. As mentioned, the computer can be fashioned as a control device for a technical device. In this case, the usage part can be a controller of the technical device; the usage actions are operating modes of the technical device. The technical device can in particular be fashioned as a medical imaging system.

BRIEF DESCRIPTION OF THE DRAWINGS

FIG. 1 is a schematic block diagram of an embodiment of a computer constructed and operating in accordance with the present invention.

FIG. 2 is flowchart illustrating an embodiment of the inventive method.

FIG. 3 is a schematic block diagram illustrating a first embodiment for use of the computer in accordance with the present invention.

FIG. 4 is a flowchart of an embodiment for operation of the computer in FIG. 3.

FIG. 5 is a schematic block diagram illustrating a second embodiment for use of the computer in accordance with the present invention.

DESCRIPTION OF THE PREFERRED EMBODIMENTS

Figure 6:
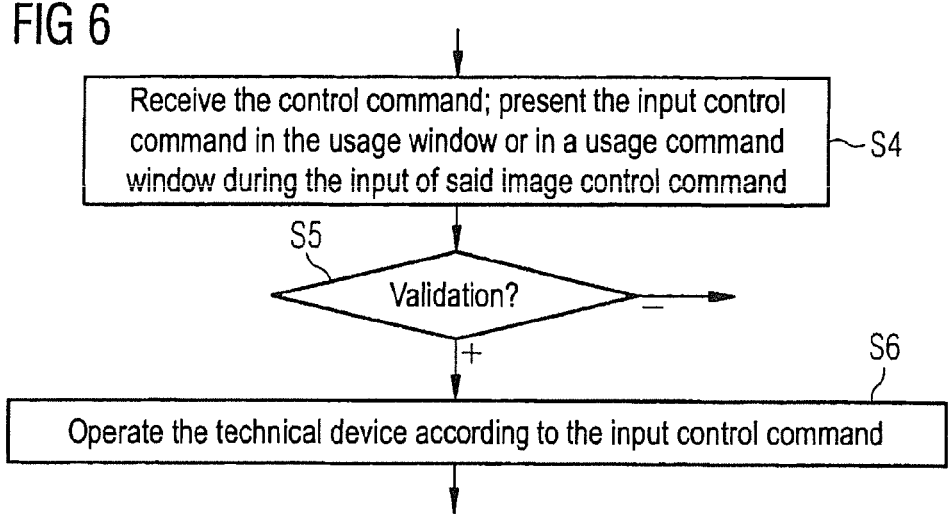
FIG. 6 is a flowchart of an embodiment for operating the computer of FIG. 5.

According to FIG. 1, a computer 1 is provided that, except as described below, is fashioned as is typical in the prior art. In the framework of the present invention, it is essential that the computer 1 be programmed with a program 2 that can be executed by the computer 1.

The programming of the computer 1 with the program 2 can ensue in various ways, for example already in the manufacture of the computer 1. Alternatively, it is possible to supply the program 2 to the computer 1 via a computer-computer connection. Examples of suitable computer-computer connections are a LAN or the Internet. The computer-computer connection is not shown as well in FIG. 1, for clarity. Alternatively, it is possible to supply the program 2 to the computer 1 via a data medium 3 on which the program 2 is stored in machine-readable form. The data medium 3 is in this case read out via a suitable interface, and its storage contents are accepted in the computer 1.

According FIG. 1, the data medium 3 is fashioned as a CD-ROM. This presentation is only an example. Other equivalent embodiments of the data medium 3 are possible, for example a USB memory stick or a memory card.

The program 2 according to FIG. 1 is encoded with machine code 4. The machine code 4 can be executed directly by the computer 1. The execution of the machine code 4 by the computer 1 causes the computer 1 to execute an operating method that is subsequently explained in detail in connection with FIG. 2.

According to FIG. 2, the computer 1 calls the program 2 in Step S1. For example, the calling of the program 2 can be triggered by triggering inputs that are provided to the computer 1 by a user 5 by an input device 6. In the framework of Step S1 (thus in the framework of calling the program 2) the computer 1 opens a usage window 7 of a user interface 8 of the program 2.

In Step S2, the computer 1 checks whether it should receive an input from the user 5 via the input device 6. If this is the case, the computer 1 transitions to Step S3. In Step S3, the computer 1 checks whether a usage command N for a usage part 2' of the program 2 should be provided to it. If this is the case, the computer 1 transitions to Step S4.

In Step S4, the computer 1 receives the usage command N from the user 5. Furthermore, in the framework of Step S4 it presents the input usage command N during the input of said usage command N in the usage window 7 or in a usage command window 9 of the user interface 8. The usage command window 9 is hereby associated with the usage window 7 (insofar as it is present), is different from the usage window 7.

The procedure of Step S4 is as such typical and generally known in the prior art. For example, the user 5 can input an alphanumerical character string by means of a keyboard that is part of the input device 6. The input alphanumerical character string is in this case indicated as well in the usage window 7 or in the usage command window 9 during the input of the usage command N. It is similarly typical to display a menu presentation and emphasize which command is currently selected, for example, by optical emphasis.

The input of the usage command N can coincide with its validation. However, it is alternatively possible that the validation (thus the setting to a valid state) of an input usage command N ensues separately. For example, an input usage command N can only be valid when the user 5 executes an additional mouse click or the enter key of the mentioned keyboard is operated.

The computer 1 checks the validation of the respective usage command N in Step S5. Depending on the result of Step S5, the computer 1 either returns to Step S4 or transitions to Step S6.

In Step S6, the computer 1 has the effect that a usage action A is executed. The usage action A corresponds with the validated usage command N.

The execution of the usage action A moreover typically comprises basic information 10 being displayed in a usage window 7. For example, an operation information can be displayed or the state of the usage action A can be displayed. Although the display of the basic information 10 is typical, it is not necessary.

In Step S6, the computer 1 checks whether the usage action A has already ended. If this is not the case, the computer 1 returns to Step S2. Otherwise, it transitions to Step S8. In Step S8, the computer 1 checks whether the program 2 should be ended. If this is not the case, the computer 1 returns to Step S2; otherwise it ends the execution of the program 2 in Step S9.

If the checking of Step 3 turns out negative, meaning that no usage command N should be provided, the computer 1 transitions to Step S10. In Step S10, the computer 1 receives a retrieval command C to retrieve additional information Z from the user 5 via the input device 6. The computer 1 presents the retrieval command C in a retrieval command window 11 of the user interface 8 during the input of said retrieval command C. Step S8 corresponds in its approach with Step S4. The retrieval command window 11 is a window different than the usage window 7. In the event that the usage command window 9 is present, the retrieval command window 11 is also a window different than the usage command window 9.

Analogous to Step S5, in Step S11 the computer 1 checks whether the input retrieval command C is validated. After the validation of the respective retrieval command C, the computer 1 retrieves the corresponding additional information Z from a web server 12 in Step S12 and outputs the additional information Z to the user 5. The output can ensue via the retrieval command window 11 or an information window 13. The information window 13 is likewise a window different than the usage window 7, the usage command window 9 and the retrieval command window 11. The retrieval and output of the additional information Z is an action different from the usage action A, independent of in which window 11, 13 the output ensues.

FIGS. 3 and 4 show a possible application of the present invention in the framework of an image evaluation. In this case, the computer 1 is connected with a storage device 14 (at least among other things) in which a number of images B are stored. According to FIG. 4, in which only Steps S3 through S5 from FIG. 2 are presented, the usage commands N according to Step S4 from FIG. 4 are image selection commands to select the images B to be displayed, and the usage actions A according to Step S6 from FIG. 4 are the output of images B.

The images B are hereby not part of the program 2, rather are retrieved from the storage device 14.

FIGS. 5 and 6 show an additional possible application of the present invention. The application according to FIGS. 5 and 6 can be combined with the application according to FIGS. 3 and 4, but this is not necessary.

According to FIG. 5, the computer 1 is fashioned as a control device for a technical device 15. The technical device 15 is thus controlled by the computer 1.

The technical device 15 can in principle be an arbitrary technical device. According to FIG. 5, the technical device 15 is fashioned as a medical imaging system.

In the embodiment according to FIGS. 5 and 6, the usage part 2' of the program 2 forms a controller of the technical device 15. In this case the usage commands N according to Step S4 of FIG. 6 are control commands for the technical device 15, and the usage actions A according to Step S6 of FIG. 6 are operating modes of the technical device 15.

As mentioned, the technical device 15 can in principle be an arbitrary technical device. For example, the technical device 15 can be an industrial technical system, for example a tool machine or a production machine. The technical device 15 can also be fashioned as a robot. In a preferred embodiment of the present invention, however, the technical device 15 is a medical system, in particular a medical imaging system. Examples of such medical imaging systems are x-ray systems of various types, magnetic resonance systems and ultrasound tomography systems.

In the embodiment as a medical imaging system, for example, the typical graphical user interface for operation of the medical imaging system 15 can be realized in the usage window 7. This workflow ensues as is known in prior art, but the retrieval and display of the additional information Z additionally ensue via the retrieval command window 11 and/or the information window 13.

Figure 7:
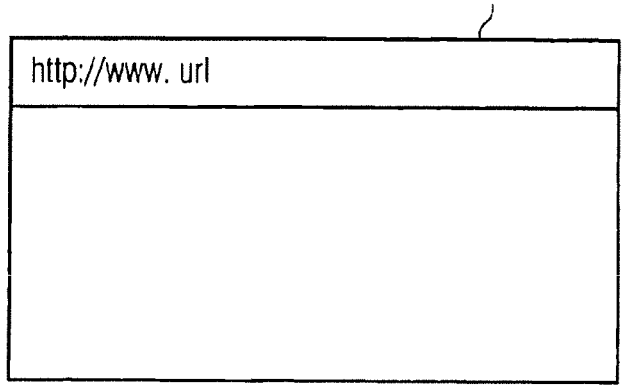
FIG. 7 schematically illustrates an example of a display at a monitor of the computer in accordance with the present invention.

The information window 13 can be fashioned in an arbitrary manner insofar as it has the functionality mentioned in the preceding. The retrieval commands C can also be of arbitrary design insofar as they realize the functionality mentioned in the preceding. However, according to FIG. 7 it is preferred that the information window 13 is fashioned as a browser window. The information window 13 can hereby in particular realize the functionality of a web browser.

Figure 8:
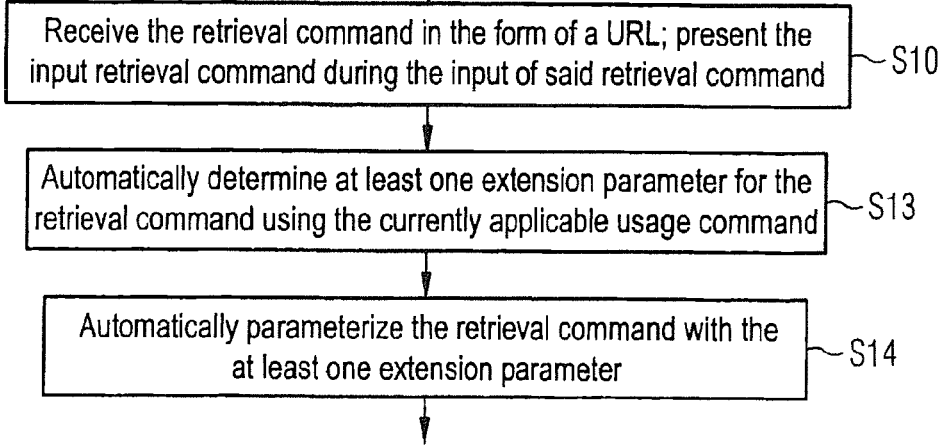
FIG. 8 is a flowchart of an embodiment for providing retrieval commands in the computer in accordance with the present invention.

In the case of the embodiment of the information window 13 as a browser window, the computer 1 according to FIG. 8 (in which is shown, among other things, Step S10 from FIG. 2) receives the retrieval commands C in the form of URLs. The term URL is hereby generally known to those skilled in the art in the field of Internet technology. It stands for Universal Resource Locator.

FIG. 8 simultaneously shows an additional preferred embodiment of the manner in which the retrieval commands C are provided. This embodiment is advantageously combined with the specification of the retrieval commands C as URLs. However, the embodiment is also possible when the retrieval commands C are specified in a different manner.

According to FIG. 8, Step S10 is extended via Steps S13 and S14. In Step S13, the computer 1 automatically determines at least one extension parameter using the currently applicable usage command N. In Step S13, the computer 1 automatically parameterizes the retrieval command C with the at least one extension parameter. For example, due to the interaction in the framework of the input of the usage command N it can be known to the computer 1 which procedure is presently being executed or which person is presently being examined. Such information can be automatically added to the retrieval command C as needed.

The present invention has many advantages. In particular, due to the present invention the additional information Z can be integrated into the user interface of the program 2. Nevertheless, it is not necessary to produce a customer-specific adaptation of the program 2. Due to embodiment according to the invention, the composition and preparation of the additional information Z can ensue in the framework of the web server 12. Only the display of the additional information Z ensues in the framework of the program 2. Insofar as the retrieval commands C are designed as URLs, each retrieval command C can furthermore be assembled by means of a template-based method from data that exist within the usage part 2' of the program 2, for example information about the procedure to be executed, information about a patient, etc. Due to the present invention, an automatic linking of information of the usage part 2' on the one hand with retrieval commands C on the other hand is also possible in particular.

Although modifications and changes may be suggested by those skilled in the art, it is the intention of the inventors to embody within the patent warranted hereon all changes and modifications as reasonably and properly come within the scope of their contribution to the art.

We claim as our invention:

1. An operating method for a control device of a medical imaging technology system, said method comprising:
   programming a control device to execute an application;
   in said control device, calling said application in a calling procedure that includes opening a use window of a user interface of the application;
   in said control device, via the opened use window, receiving a use command from a user via an input device for a usage part of the application comprising a controller of the medical imaging technology system, presenting said use command during input thereof at a display screen in a first presentation window selected from the group consisting of said use window and a use command window of the user interface that is associated with the use window but is different from the use window, and executing an operating mode of the medical imaging technology system corresponding to said use command after validating said use command;

during execution of the application by said control device, receiving a retrieval command as an input from the user via the input device, said retrieval command being different from said use and designating additional information to be retrieved by the control unit, presenting the retrieval command in a retrieval command window of the user interface during input of the retrieval command, in said control unit, automatically determining at least one extension parameter dependent on said use command and automatically parameterizing said retrieval command with said at least one extension parameter to produce an extended retrieval command that augments, as augmented information, said additional information, automatically validating said extended retrieval command in said control unit, and retrieving said augmented information from a web server after validation of the extended retrieval command and, in a second display window selected from the group consisting of the retrieval command window and an information window of the user interface that is different from the retrieval command window and is associated with the retrieval command window, presenting the additional information;

implementing said retrieval of said augmented information and said presentation of said additional information in separate actions that are different from said reception and presentation of said use command; and displaying said first presentation window at said display screen differently and separately from said second presentation window.

2. A method as claimed in claim 1 comprising configuring said operating mode as displaying basic information in said use window.

3. A method as claimed in claim 1 comprising configuring said operating mode as display of images in said use window, and configuring said use commands as image selection commands to select said images to be displayed, said images not being components of said application.

4. A method as claimed in claim 1 comprising using said information window to present said additional information and configuring said information window as a browser window, and configuring said control device to receive said retrieval commands formatted as URLs.

5. A method as claimed in claim 4 comprising configuring said information window as a web browser.

6. An imaging medical technology system comprising:
a medical imaging device component;
a computerized control device having an associated input unit and display;
control device being programmed to execute an application, said control device comprising a display screen;
said control device being configured to call said application in a calling procedure that includes opening a use window, at said display screen, of a user interface of the application;
said control device, via the opened use window, being configured to receive a use command from a user via said input unit for a usage part of the application comprising a controller of the medical imaging technology system, and to present said use command during input thereof at said display screen in a first presentation window selected from the group consisting of said use window and a use command window of the user interface at said display screen that is associated with the use window but is different from the use window, and to control an operating mode of the medical imaging technology system corresponding to said user command after validating said use command;

during execution of the application by said control device, said control device being configured to receive a retrieval as an input from the user via the input device, said retrieval command being different from said use command, and to present the retrieval command in a retrieval command window of the user interface during input of the retrieval command, and to automatically determine at least one extension parameter dependent on said use command, automatically parameterize said retrieval command with said at least one extension parameter to produce an extended retrieval command that augments, as augmented information, said additional information, and to automatically validate said extended retrieval command in said control unit, and to retrieve said augmented information from a web server after validation of the extended retrieval command and, in a second presentation window at said display screen selected from the group consisting of the retrieval command window and an information window of the user interface that is different from the retrieval command window and is associated with the retrieval command window, to present the augmented information;

said control unit being configured to implement said retrieval of said augmented information and said presentation of said augmented information in separate actions that are different from said reception and presentation of said use command; and said control unit being configured to display said first presentation window and said second presentation window differently and separately from said second presentation window at said display screen.

7. A non-transitory, computer-readable data storage medium encoded with programming instructions that, when said storage medium is loaded into a control computer of a medical imaging technology system, cause the control computer to:
be programmed to execute an application;
call said application in a calling procedure that includes opening a use window of a user interface of the application;
via the opened use window, receive a use command from a user via an input device for a usage part of the application comprising a controller of the medical imaging technology system, present said use command during input thereof at a display screen in a first presentation window selected from the group consisting of said use window and a use command window of the user interface that is associated with the use window but is different from the use window, and execute an operating mode of the medical imaging technology system corresponding to said use command after validating said use command;
during execution of the application by said control device, receive a retrieval command as an input from the user via the input device, said retrieval command being different from said use and designating additional information to be retrieved by the control unit, present the retrieval command in a retrieval command window of the user interface during input of the retrieval command, automatically determine at least one extension parameter dependent on said use command and automatically parameterize said retrieval command with said at least one extension parameter to produce an extended retrieval command that augments, as augmented information, said additional information, automatically validate said extended retrieval command, and retrieve said augmented information from a web server after validation of the extended retrieval command and, in a second display window selected from the group consisting of the retrieval command window and an information window of the user interface that is different from the retrieval command window and is associated with the retrieval command window, present the additional information;

implement said retrieval of said augmented information and said presentation of said additional information in separate actions that are different from said reception and presentation of said use command; and display said first presentation window at said display screen differently and separately from said second presentation window.

8. A computerized control unit programmed to operate in communication with an input unit and a display, by:

executing an application, when called;

call said application in a calling procedure that includes opening a use window of a user interface of the application;

via the opened use window, receiving a use command from a user via an input device for a usage part of the application comprising a controller of the medical imaging technology system, presenting said use command during input thereof at a display screen in a first presentation window selected from the group consisting of said use window and a use command window of the user interface that is associated with the use window but is different from the use window, and executing an operating mode of the medical imaging technology system corresponding to said use command after validating said use command;

during execution of the application by said control device, receiving a retrieval command as an input from the user via the input device, said retrieval command being different from said use and designating additional information to be retrieved by the control unit, presenting the retrieval command in a retrieval command window of the user interface during input of the retrieval command, automatically determining at least one extension parameter dependent on said use command and automatically parameterizing said retrieval command with said at least one extension parameter to produce an extended retrieval command that augments, as augmented information, said additional information, automatically validating said extended retrieval command, and retrieving said augmented information from a web server after validation of the extended retrieval command and, in a second display window selected from the group consisting of the retrieval command window and an information window of the user interface that is different from the retrieval command window and is associated with the retrieval command window, presenting the additional information;

implementing said retrieval of said augmented information and said presentation of said additional information in separate actions that are different from said reception and presentation of said use command; and displaying said first presentation window at said display screen differently and separately from said second presentation window.

* * * * *